United States Patent [19]

Crismon et al.

[11] Patent Number: 5,279,426
[45] Date of Patent: Jan. 18, 1994

[54] EJECTION FINGER

[75] Inventors: James E. Crismon; Jerry W. Brun, both of Modesto, Calif.

[73] Assignee: ESM International, Inc., Houston, Tex.

[21] Appl. No.: 979,790

[22] Filed: Nov. 20, 1992

[51] Int. Cl.5 .................................. B07C 9/00
[52] U.S. Cl. .................. 209/657; 209/580; 209/587; 209/939
[58] Field of Search ............. 209/580, 581, 582, 587, 209/656, 657, 908, 934, 939; 356/407, 408, 425; 250/223; 198/367; 271/303

[56] References Cited

U.S. PATENT DOCUMENTS

| | | | |
|---|---|---|---|
| 4,168,005 | 9/1979 | Sandbank | 209/657 X |
| 4,260,062 | 4/1981 | Lockett | 209/582 |
| 4,281,764 | 8/1981 | Fowler, Jr. | 209/657 X |
| 4,775,051 | 10/1988 | van der Schoot | 209/656 X |
| 5,092,470 | 3/1992 | Hakansson | 209/656 X |

FOREIGN PATENT DOCUMENTS 0241980 11/1985 Japan .................................. 209/657

OTHER PUBLICATIONS

ESM, "Agrisort-22" Brochure, 1983.

ESM International Inc., "Colorwatch—Technology That's Worth the Difference" Brochure, 1990.

Primary Examiner—D. Glenn Dayoan
Assistant Examiner—Tuan N. Nguyen
Attorney, Agent, or Firm—Vaden, Eickenroht, Thompson, Boulware & Feather

[57] ABSTRACT

A sorting machine for separating substandard items from a continuous stream of products is disclosed wherein the ejector that removes the detected substandard items includes an ejector finger of monolithic structure and homogeneous material and an actuator. The ejector finger includes a base fixedly attached with respect to the product stream, a contactor normally withdrawn from the product stream when standard products are in the stream and for entering the product stream to eject a detected substandard item, and a hinge of reduced dimension connecting the ejector finger base to the ejector finger contactor. The hinge is biased to normally withdraw the ejector finger contactor from the product stream. The actuator flexes the ejector hinge to move the ejector contactor so that it enters the product stream for ejecting each detected substandard item. The monolithic structure and homogeneous material are resistant to wear from environmental conditions.

9 Claims, 3 Drawing Sheets

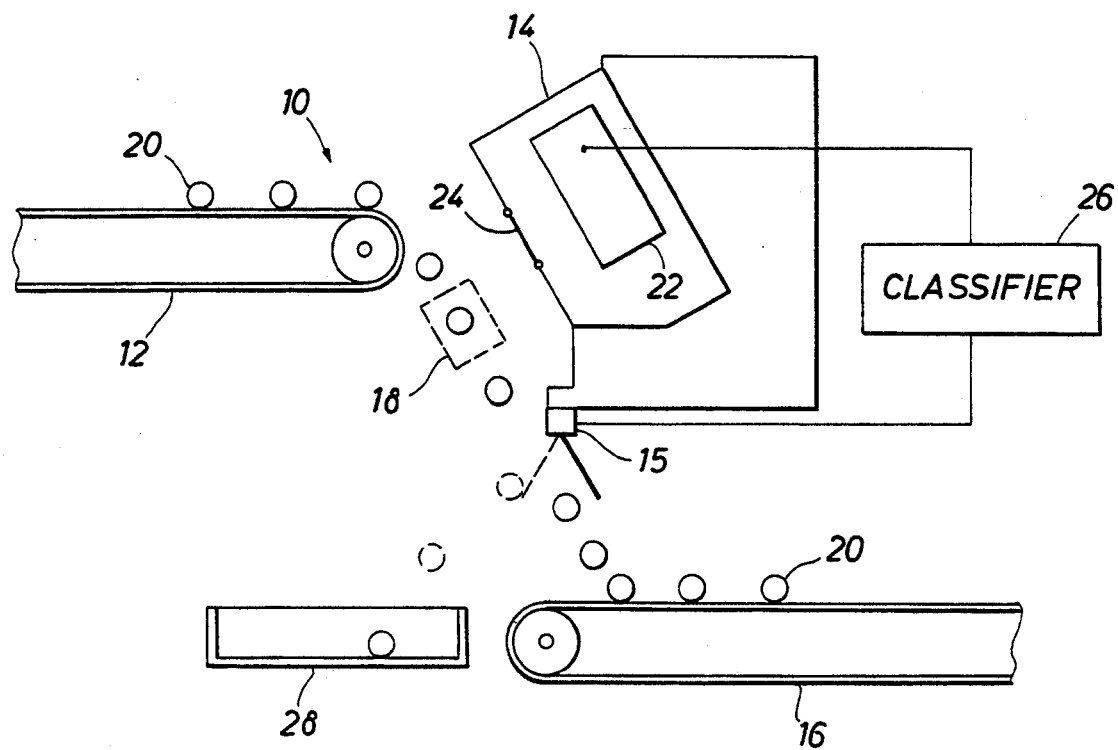
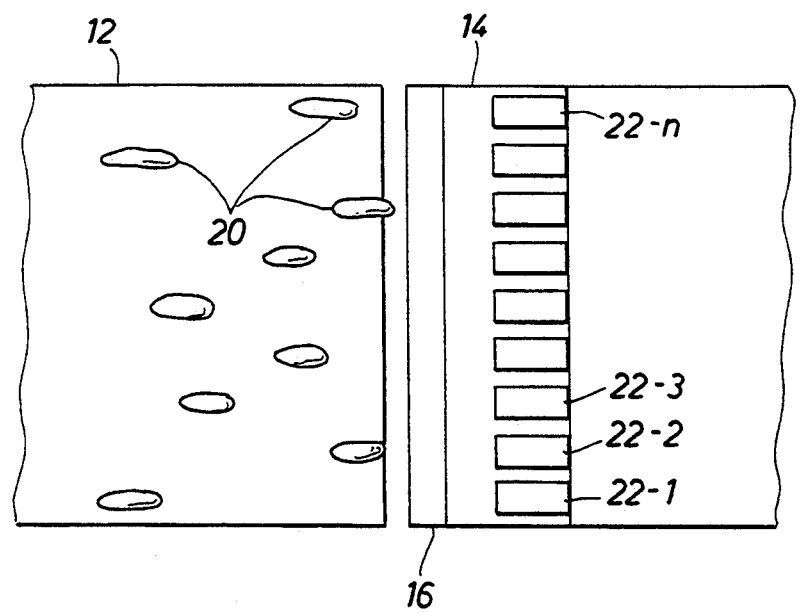
FIG.2

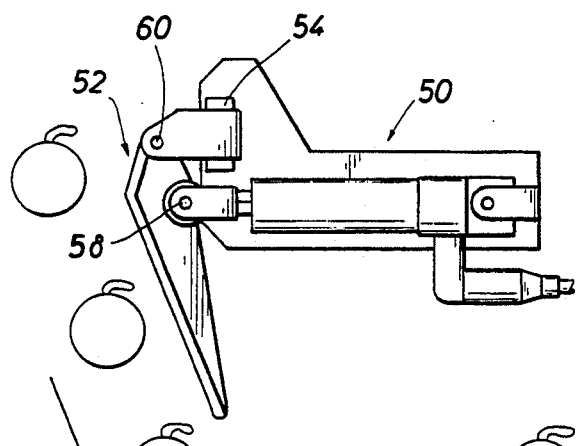
FIG. 3b
(PRIOR ART)
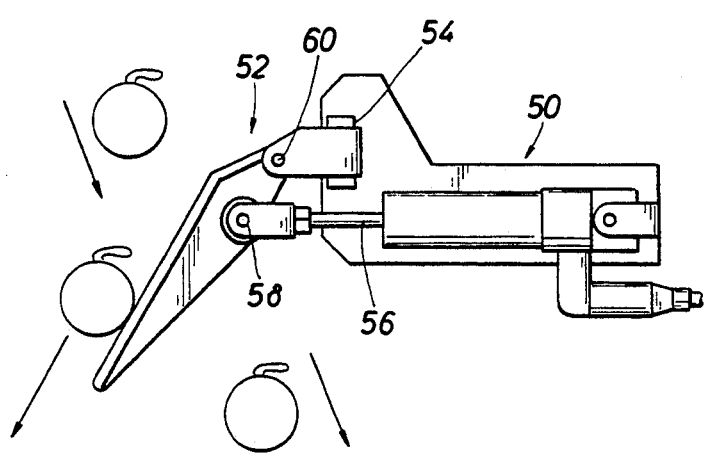
FIG. 3b
(PRIOR ART)
FIG. 4a
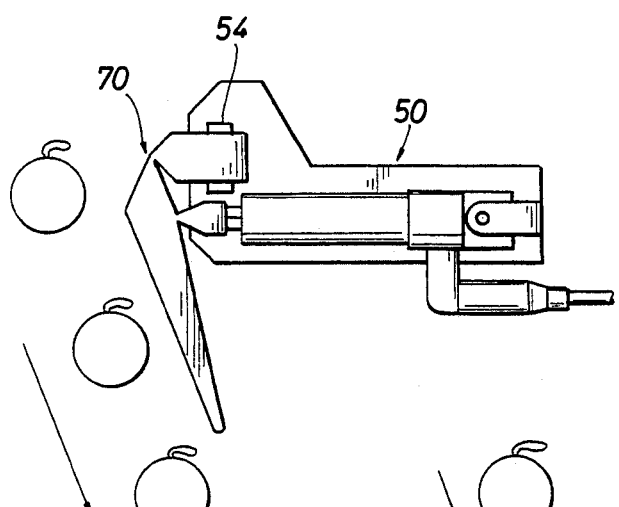
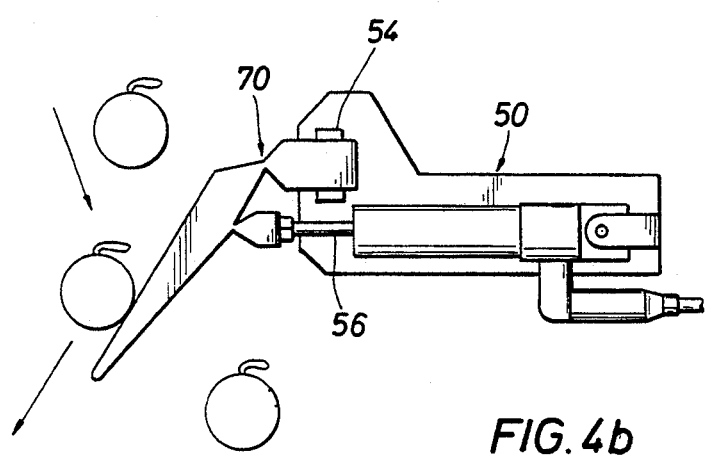
FIG. 4b FIG.5a
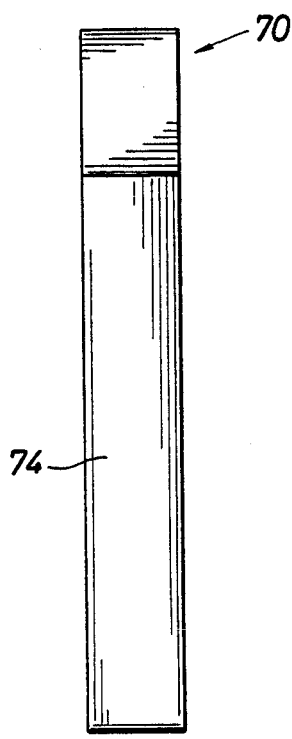
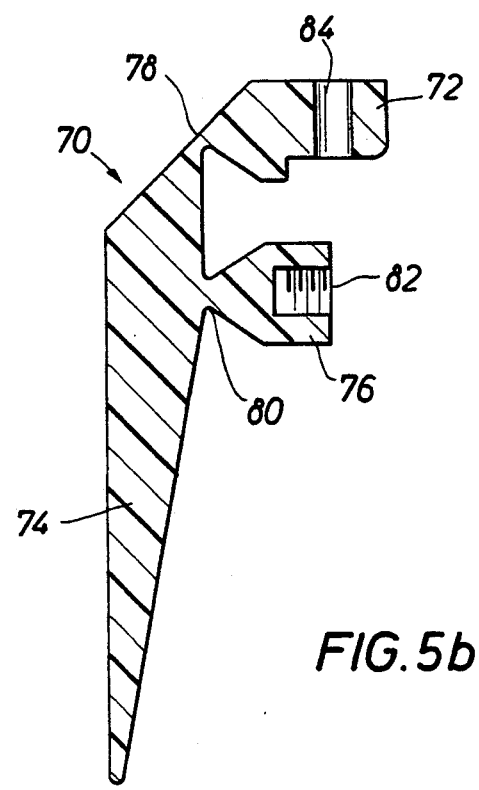
FIG.5b
FIG.5c
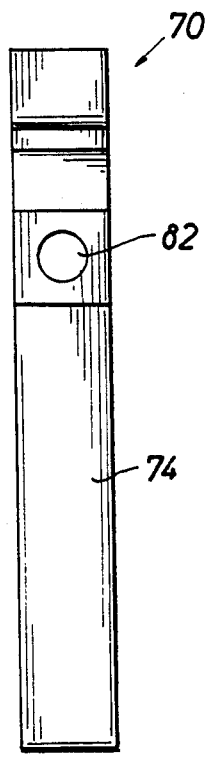
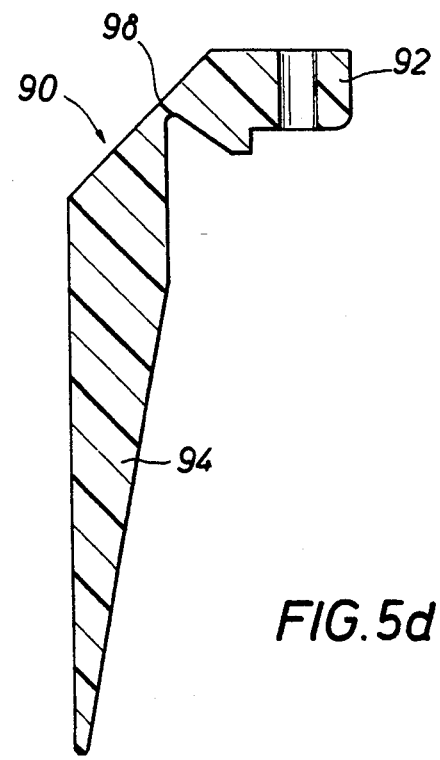
FIG.5d

EJECTION FINGER

BACKGROUND OF THE INVENTION

1. Field of the Invention

This invention generally pertains to a machine for ejecting selected items from a stream of products. More particularly this invention pertains to sorting machines that separate substandard items from standard items, the items falling through the machine in large volumes at high rates of speed.

2. Description of the Prior Art

A typical machine of the type envisioned for application of the present invention is a high speed sorting machine typically used for sorting fungible products in the food industry or otherwise. For example, individual tomatoes are caused to flow in front of an optical detector in such a machine to separate "substandard" items from standard product. The term "substandard" can apply to a tomato having undesirable characteristics or to unwanted items such as dirt clots, stems, and leaves. For instance, green tomatoes can be removed from a batch of tomatoes that are primarily red in color, or vice versa. The term may apply to product colors or different lengths or other qualities that are perfectly acceptable in the abstract, but are not within the standard limits of quality established for acceptable standard products for particular sorting.

The commonly employed sorting mechanism used in today's sorting machines is the optical sensor. Sensors include one or more photodetectors, such as photo diodes that are sensitive not only to black, white and shades of gray differences, but also to subtle variation in color hues. Also, many such sensors, including the entire sensor combination of parts, are also discriminating against different sizes of products. All of the machines of the general class fitting the above description have in common a protective, light emitting window for the sensor or sensors to protect the sensors from contamination. In some cases, the window may protect only one sensor element, but in many cases, it is common that the housing enclose a plurality of sensors that are spaced about an opening through which the stream of product to be sorted is directed.

In order to pass the product in front of the window, many such systems utilize a dual conveyor belt system. Product enters the system on an incoming belt with the end of the belt positioned above the window such that when the product drops off the end it falls in front of the window on to a lower conveyor belt located beneath the window. The sensor determines whether the product in front of the window is substandard or standard.

Such machines also include an ejector located downstream from each sensor that is actuated by an electrical signal originating from sensor detection. When a substandard product is detected, an electrical actuating signal is produced and the ejector is actuated just as the substandard product and the ejector are in alignment. Therefore, there is a delay between detection and ejection, but it is ever so slight because the further the ejector is from the detector, the more substandard product can escape by being diverted or hit by other product in the product stream. The ejector is normally located as close as possible to the sensor or sensors, ideally being just downstream therefrom and closely adjacent thereto.

The ejector mechanism can be a compressed air ejector when sorting smaller sized fungible product. However, when sorting larger fungible products such as tomatoes or potatoes, mechanical ejector mechanisms are almost universally used. That is, when the substandard product arrives opposite the ejector, the ejector is moved into physical contact with the substandard product forcing it out of the standard product stream. A typical ejector includes an ejector finger which is forced into the product stream to remove detected substandard products by an actuating means, such as that shown in U.S. Pat. No. 4,260,062 issued to Lockett and assigned to the assignee of the present invention. The ejector finger is actuated by a pneumatic valve having a pneumatic cylinder mounted to a stationary frame, wherein the finger is pivotally connected to the frame, a connection stationary relative to the product flow, and pivotally connected to the rod of the cylinder, a connection movable relative to the product flow. Upon receipt from the electrical actuating signal from the sensor, the valve is activated, thereby extending the cylinder rod and extending the finger into the product stream. This is done with such speed and accuracy that substandard products can be removed from the product stream, while standard products are allowed to continue undisturbed in the "good" product stream. The ejection cycle can occur in excess of 1/30th a second.

An ejector finger of the type described above includes an elongate contactor pivotally connected to the frame by a pin and bushing. The contactor is also pivotally connected to the cylinder rod by a second pin and bushing. Although this type of ejector finger is presently being used to sort products effectively, the life span of a finger is short relative to the life span expectancy of a sorting machine. This short life span is due to the wear on the pivot points. The wear is primarily caused by a combination of environmental effects, including, mud, dust, dirt and small bits of product, the speed of an ejection cycle, and the number of ejection cycles the finger undergoes during the lifetime of the machine. Typically, an ejector finger may be cycled as many times as three (3) million cycles in a three month period, which represent the approximate time of a harvesting season. In most cases, the ejector finger will not last the duration of a harvesting season and require replacement. Most of the industrial sorters include a plurality of fingers associated with each of a plurality of sensors. Replacing these fingers prior to the end of a harvesting season is a very costly and time consuming process, not to mention, an inconvenience during the most active time of the machine's use.

Therefore, it is a feature of the present invention to provide an improved sorting machine including a mechanical ejecting separation of substandard products, from a stream of products wherein the mechanical ejector mechanism will function at least through the duration of a harvest season.

It is another feature of the present invention to provide an improved mechanical ejector for separating substandard products from a stream of products passing through a sorting machine, wherein the mechanical ejector is less susceptible to the environmental conditions to thereby enhance the life span of the ejector.

It is yet another feature of the present invention to provide an improved less expensive and easily replaceable mechanical ejector for separating substandard products from a stream of products passing through a sorting machine.

SUMMARY OF THE INVENTION

In accordance with the present invention, a sorting machine for separating identifiable substandard items from a stream of products traveling through the machine includes a viewing means having at least one optical sensor element positioned for viewing a viewing area through which the products pass. An electronic means is connected to the sensor element for producing an actuator signal whenever a substandard item in the product stream is detected by the sensor element. An ejector located downstream from the viewing means is actuated by the actuator signal to eject each detected substandard item. The ejector includes an ejector finger of monolithic structure and homogeneous material and an actuator for moving the ejector finger to eject each detected substandard item from the product stream. The ejector finger consists of a base fixedly attached with respect to the product stream, a contactor normally withdrawn from the product stream when standard products are in the stream and for entering the product stream to eject a detected substandard item, and a hinge of reduced dimension connecting the ejector finger base to the ejector finger contactor. The ejector finger hinge can be biased, and in a preferred embodiment is actively moved, to withdraw said ejector finger contactor from the product stream. The actuator is movably operated upon the receipt of the actuator signal for flexing the ejector finger hinge to move the ejector contactor so that it enters the product stream to eject each detected substandard item therefrom.

In the preferred embodiment illustrated herein, the ejector finger additionally includes an actuator member that connects to said actuator and a second ejector finger hinge of reduced dimension connecting the ejector finger actuator member to the ejector finger contactor. In addition to moving the ejector contactor into the product stream to eject each detected substandard item, the actuator withdraws the contactor from the product stream after each substandard item ejection.

Thus all pins and bushing at the pivot points employed with the prior art finger ejector described above are not present in either of the embodiments described herein, making the ejector finger less susceptible to wear due to the environmental conditions. Since, the ejector fingers are a monolithic structure of homogeneous material, they are easy to manufacture inexpensively and very easy to replace.

BRIEF DESCRIPTION OF THE DRAWINGS

So that the manner in which the above recited features, advantages and objects of the invention as well as others which will become apparent, are obtained and can be understood in detail, more particular description of the invention briefly summarized above may be had by reference to the embodiment thereof which is illustrated in the appended drawings, which drawings form part of this specification. It is to be noted, however, that the drawings illustrate only a preferred embodiment of the invention and is therefore not considered limiting of scope as the invention may admit to other equally effective embodiments.

In the Drawings:

FIG. 1 is an elevational view of sorting machine for separating substandard products from a stream of fungible products in accordance with the preferred embodiment of this invention.

FIG. 2 is a planned view of the machine shown in FIG. 1.

FIG. 3a is an elevational view of a prior art ejecting mechanism in the retracted position.

FIG. 3b is an elevational view of the ejector mechanism shown in FIG. 3a in the ejecting position.

FIG. 4a is elevational view an ejector mechanism in accordance with the preferred embodiment of this invention in the retracted position.

FIG. 4b is the elevational view of the ejector mechanism of FIG. 4a in the ejecting position.

FIG. 5a is the front view of an ejector finger constructed in accordance with the preferred embodiment of this invention.

FIG. 5b is a cross-sectional side view of the finger shown in FIG. 5a.

FIG. 5c is the back view of the finger shown in FIG. 5a.

FIG. 5d is a cross-sectional side view of an ejector finger constructed in accordance with an alternate embodiment of this invention.

DESCRIPTION OF THE PREFERRED EMBODIMENT

Now referring to the drawings, and first to FIGS. 1 and 2, a multi-detector, high speed sorter for separating substandard fungible products from a passing stream of such products is shown. Generally, machine 10 includes incoming conveyor belt 12, viewing means 14, ejector 15, and lower conveyor belt 16. Incoming conveyor belt 12 is located above viewing area, which is diagrammatically indicated as 18, such that when product 20 drops off the end of incoming conveyor belt 12, gravity pulls product 20 through viewing area 18. Lower conveyor belt 16 is located beneath viewing area 18 such that any standard product lands on lower conveyor belt 16 after passing viewing area 18.

The products to be separated or sorted by machine 10 are normally comestible products such as tomatoes that are graded and separated on the basis of color characteristics. Of course, any products, comestible or other, that are separable on the basis of color distinction can be sorted.

Viewing means 14 may include a plurality of sensor elements or detectors, indicated by reference numeral 22-1, 22-2, 22-3, . . . 22-$n$. The 22-1 . . . 22-$n$ sensor elements are disposed in a side by side arrangement so as to completely encompass within their field of view the illuminated viewing area 18. Optical sensors 22 are located within viewer 14 behind window 24 to prevent sensors 22 from being damaged or contaminated by dirt unavoidably encountered during the sorting process. As the flow of product passes by sensors 22, substandard items are sensed or detected. The sensing can be in a single spectral range for monochromatic detection, into separate spectral ranges for bi-chromatic detection, or in a plurality of spectral ranges from multi-chromatic detection. It is understood that a "spectral range" can be wholly or partially in the visual spectrum or can be wholly or partially in the non-visual spectrum. For example, sensing in the infrared range is commonly done. There are many optical sensor schemes well-known in the art.

When a substandard item is sensed, sensor 22 produces an electrical signal reflective of the color being detected. Classifier 26 receives the electrical signal and produces an actuating signal in the event the detected item is substandard. The actuation signal will activate ejector 15 when the substandard item and ejector 15 are in alignment. The sensor and classifier used in the preferred embodiment of the invention are fully described in U.S. patent application Ser. No. 07/709,485.

The delay in actuation is very short following the time of sensing, the timing being such to produce the desired expelling of the detected substandard item and is accomplished in a manner well known in the art. The items removed in the process fall down into reject accumulator 28 for subsequent disposal. The items not removed from the product stream continue to fall onto lower conveyor belt 16 to be gathered or packaged as quality products passing the preset sorting standard. The control of the flow and the sensitivity of the sensors are controlled by preset controls that are well known in the art.

The sorting machine, having the characteristics described above, used in the preferred embodiment of the invention, is the COLORWATCH system, Model Number 49033, manufactured and distributed by the assignee of the present invention, which is an electronically controlled optical sorting machine. The basic principles of operation are typical of other electronically controlled optical sorters. A product is brought into the machine, tested for distinguishing characteristics, and accepted or rejected based on those characteristics. However, this machine is specially designed to discriminate between acceptable and unacceptable products by optically detecting the color of each product and comparing it to a minimum acceptable standards.

Once a substandard item is detected, an ejector such as that shown in FIGS. 3a and 3b is activated to physically remove the substandard item from the stream as shown in FIG. 3b. Normally the ejector is in the retracted position to allow acceptable products to flow down to lower conveyor belt 16 as shown in FIG. 3a. The ejector includes pneumatic valve (not shown) attached to mounting platform, generally referred to as 50, and finger, generally referred to as 52. Finger 52 is mounted to mounting platform 50 through mounting bolt 54. Piston 56 of the pneumatic cylinder is pivotally connected to finger 52 by a pin and bushing at pivot point 58. As finger 52 is extended by piston 56, finger 52 pivots around pivot point 60 which includes a pin and bushing. It is the pins and bushings located at pivot points 58 and 60 that break down due to wear caused by environmental conditions prior to the end of a single sorting season.

FIGS. 4a and 4b show ejector finger 70 made in accordance with the preferred embodiment of this invention in the retracted and ejecting positions, respectively. FIGS. 5a through 5c show ejector finger removed from the pneumatic cylinder in front, side and back views, respectively.

Ejector finger 70 is a monolithic structure comprised of a homogeneous material, which in the preferred embodiment of this invention is 90 Shore A durometer urethane. FIG. 5b shows that ejector finger includes three basic parts: base 72, contactor 74, and actuator member 76. First hinge 78 of reduced dimension connects base 72 to contactor 74. Second hinge 80 also of reduced dimension connects actuator member 76 to contactor 74. The dimensions of these hinges and respective parts vary depending on the sizes of the respective finger members, the characteristics of the homogeneous structure, and the desired longevity of ejector finger 70.

Even though the 90 Shore A urethane is used, any material can be used, which is capable of being molded and is strong enough to withstand contact with and eject a product from a product stream, yet soft enough to bend in its reduced dimension locations. Once the material is selected, then the dimension of first hinge 78 is critical because this hinge travels through the greatest range of motion. At its narrowest dimension, first hinge 78 must be thin enough to be flexible, yet thick enough to withstand the required number of ejecting cycles. Once the dimensions of the ejector finger have been determined, molding the material can be easily performed by one skilled in the art.

In the preferred embodiment of this invention, the vertical dimension of finger 70 is 5.25 inches while the width of finger 70 shown in FIG. 5a and FIG. 5c is 0.74 inches. First pivot point 78 is located approximately 0.5 inches from the top of finger 70. The thickness of first hinge 78 at the narrowest dimension is preferably 0.125 inches. The thickness of second hinge 80 at its narrowest dimension is 0.25 inches. Second hinge 80 must be thin enough to bend when the finger is pushed into the ejecting position. Opening 82 is a $\frac{1}{4}$-28 tapped hole which is large enough to receive piston 56 of the pneumatic cylinder. Mounting bolt 54 is passed through opening 84 to mount finger 70 to mounting platform 50.

FIG. 5d shows an alternate embodiment of this invention where ejector finger 90 consists of only base member 92 and a contactor member 94 connected through a hinge 98. The hinge is biased to normally withdraw ejector finger contactor 94 from the product stream as shown in FIG. 5d. Piston 56 of the actuator 50 contacts contactor 94 to flex hinge 98 and move contactor 94 so that it enters the product stream for ejecting each detected substandard product therefrom. However, the piston is not directly connected to contactor 94. Therefore, when piston 56 is retracted into the pneumatic cylinder, hinge 98 moves contactor 94 out of the product stream.

It is apparent that the fingers shown in FIGS. 4 and 5 are not limited to the size and shape shown; the sizes and dimensions of the parts can vary. In addition, steel plates could be implanted in the contactor to strengthen the material.

It is also apparent that the products could be passed by the viewing window by some other means other than the conveyor belt, the invention not being limited by the manner by which the product stream is achieved. Moreover, the particular viewing arrangement of sensors and the electronic system creating the actuation signal to the actuator is not critical to the invention, although a particular mode of operation well known in the art has been described for each thing. Moreover, the ejector finger is not limited to an inspection sorting application. For example, it may be used in a manufacturing application to move a part from an assembly line during the manufacturing procedure. Thus, it would be understood that while a preferred embodiment and alternate embodiment of the invention have been shown and described, the invention is not limited hereto. Many modifications may be and will become apparent to those skilled in the art.

What is claimed is:

1. Sorting machine for separating identifiable substandard items from a stream of products traveling through the machine comprising:

a viewing area through which the products flow;

viewing means having at least one optical sensor element positioned for viewing said viewing area;

electronic means connected to said sensor element for producing an actuator signal whenever a substandard item in the product flow is detected by said sensor element;

an ejector located downstream from said viewing means actuated by the actuator signal for ejecting each detected substandard item, wherein said ejector includes an ejector finger of monolithic structure and of homogeneous material, including a base fixedly attached with respect to the product stream, a contactor normally withdrawn from the product stream when standard products are in the stream and for entering the product stream to eject a detected substandard item, and a hinge of reduced dimension connecting said ejector finger base to said ejector finger contactor, said hinge biased to normally withdraw said ejector finger contactor from the product stream, and an actuator movably operated upon the receipt of an actuator signal for flexing said ejector finger hinge to move said ejector finger contactor so that it enters the product stream for ejecting each detected substandard item therefrom.

2. Sorting machine in accordance with claim 1, wherein said actuator is an ejector piston.

3. Sorting machine in accordance with claim 2, wherein said ejector piston is connected to said ejector contactor to withdraw said contactor from the product stream after each substandard item ejection.

4. Sorting machine in accordance with claim 2, wherein said ejector finger additionally includes an actuator member for connecting to said ejector piston, and a second hinge of reduced dimension connecting said ejector finger actuator member to said ejector finger contactor.

5. A sorting machine in accordance with claim 4, wherein said ejector finger base and said ejector finger hinge are located at one end of said contactor and said actuator member is located intermediate the two ends of said contactor.

6. A sorting machine in accordance with claim 1, wherein said homogeneous material is 90A urethane.

7. A sorting machine in accordance with claim 1, wherein the thickness of ejector finger hinge at its narrowest dimension is 0.125 inches.

8. Sorting machine for separating identifiable substandard items from a flow of products traveling through the machine comprising a viewing area through which the products flow, viewing means having at least one optical sensor element positioned for viewing said viewing area electronic means connected to said sensor element for producing an actuator signal whenever a substandard item in the product flow is detected by said sensor element an ejector located downstream from said viewing means actuated by the actuator signal for ejecting each detected substandard item, wherein said ejector includes an ejector finger of monolithic structure of homogeneous material, including a base fixedly attached with respect to the product stream, a contactor normally withdrawn from the product stream when standard products are in the stream and for entering the product stream to eject the detected substandard item, a first hinge of reduced dimension connecting said ejector finger base to said ejector finger contactor, an actuator member, and a second hinge of reduced dimension connecting said ejector finger actuator member to said ejector finger contactor, and an actuator connected to said actuator member movably operated upon the receipt of an actuator signal for flexing said first and second ejector hinges to move said ejector contactor so that it enters the product stream for ejecting each detected substandard item therefrom and to withdraw said ejector finger contactor from the product stream after each ejection.

9. An ejector for removing a detected item from a stream of products comprising an ejector finger of monolithic structure and of homogeneous material, including a base fixedly attached with respect to the product stream, a contactor normally withdrawn from the product stream when undetected products are in the stream and for entering the product stream to eject the detected item, and a hinge of reduced dimension connecting said ejector finger base to said ejector finger contactor, said hinge biased to normally withdraw said ejector finger contactor from the product stream, and an actuator movably operated upon the receipt of an actuator signal for flexing said ejector finger hinge to move said ejector contactor so that it enters the product stream for ejecting the detected item therefrom.

* * * * *

UNITED STATES PATENT AND TRADEMARK OFFICE
CERTIFICATE OF CORRECTION

PATENT NO. : 5,279,426
DATED : January 18, 1994
INVENTOR(S) : James E. Crismon, et. al.

It is certified that error appears in the above-indentified patent and that said Letters Patent is hereby corrected as shown below:

Title page, item [75], Inventor: change "Jerry W. Brun" to --Jerry W. Brum--.

Signed and Sealed this

Ninth Day of May, 1995

Attest:

BRUCE LEHMAN

*Attesting Officer*  *Commissioner of Patents and Trademarks*